US009189763B2

(12) United States Patent
Bonnard et al.

(10) Patent No.: US 9,189,763 B2
(45) Date of Patent: Nov. 17, 2015

(54) EXPEDITED PROCESS EXECUTION USING PROBABILITIES (71) Applicant: International Business Machines Corporation, Armonk, NY (US)

(72) Inventors: Philippe Bonnard, Brunoy (FR); Steven J. Demuth, Decorah, IA (US); Rania Y. Khalaf, Cambridge, MA (US); Geetika T. Lakshmanan, Winchester, MA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 13/873,596

(22) Filed: Apr. 30, 2013

(65) Prior Publication Data

US 2014/0324759 A1   Oct. 30, 2014

(51) Int. Cl.
*G06Q 10/06* (2012.01)
*G06N 7/00* (2006.01)
*G06N 5/02* (2006.01)

(52) U.S. Cl.
CPC .............. *G06Q 10/0633* (2013.01); *G06N 5/02* (2013.01); *G06N 7/005* (2013.01)

(58) Field of Classification Search
None
See application file for complete search history.

(56) References Cited

U.S. PATENT DOCUMENTS

| 2002/0174093 | A1 | 11/2002 | Casati et al. |
| 2005/0165822 | A1 | 7/2005 | Yeung et al. |
| 2009/0192844 | A1 | 7/2009 | Ramkumar et al. |
| 2012/0101974 | A1 | 4/2012 | Duan et al. |
| 2012/0323558 | A1* | 12/2012 | Nolan et al. ................. 704/9 |
| 2013/0135315 | A1* | 5/2013 | Bares et al. ................. 345/473 |
| 2014/0039964 | A1* | 2/2014 | Sengupta ................. 705/7.25 |

OTHER PUBLICATIONS

Klingemann, Controlled Flexibility in Workflow Management, 2000.*
Chen et al, Continuous Process Improvement Based on Adaptive Workflow Mining Technique, 2012.*
A. Charfi et al.; "Aspect-oriented Web Service Composition with AO4BPEL;" Proc. of the European Conference on Web Services (ECOWS 2004), Erfurt, Germany, Springer LNCS, vol. 3250, Sep. 2004; pp. 168-182.
D. Fahland et al; "Analysis on Demand: Instantaneous Soundness Checking of Industrial Business Process Models;" Data and Knowledge Engineering 70 (2011); pp. 448-466.
O. Kopp et al.; "Deriving Explicit Data Links in WS-BPEL Processes;" IEEE International Conference on Services Computing; Jul. 2008; pp. 367-376.
O. Kopp et al.; "A Classification of BPEL Extensions;" Journal of Systems Integration Apr. 2011; 26 pages.

(Continued)

*Primary Examiner* — Jeffrey A Gaffin
*Assistant Examiner* — Mikayla Chubb
(74) *Attorney, Agent, or Firm* — Cantor Colburn LLP; Rahan Uddin (57) ABSTRACT

Embodiments relate to determining a process outcome based on a computed probability and altering the path of a process instance based on an expediting rule. An aspect includes executing, by a processing device, a process instance in a process diagram, which includes a plurality of process steps. A condition associated with a first process step is identified. An outcome for the first process step is then determined based on a computed probability. Accordingly, the first process step is bypassed and the process instance is branched to a second process step based on an expediting rule. The expediting rule includes the condition and a branching action according to a selected outcome.

20 Claims, 6 Drawing Sheets

(56) References Cited

OTHER PUBLICATIONS

G. Lakshmanan et al.; "Leveraging Process Mining Techniques to Analyze Semi-Structured Processes;" IT Professional, IEEE Computer Society, IEEE, 2012; 13 pages.

S. Natarajan et al; "A Relational Hierarchical Model of Decision-Theoretic Assistance;" Knowledge and Information Systems(KAIS) 2011; 15 pages.

U.S. Appl. No. 13/892,408; Non-Final Office Action; Date Filed: May 13, 2013; Date Mailed: Mar. 26, 2015 42 pages.

* cited by examiner

EXPEDITED PROCESS EXECUTION USING PROBABILITIES

BACKGROUND

The present invention relates generally to the management of business processes, and more specifically, to determining a process outcome based on a computed probability and altering the path of a process instance based on an expediting rule.

In a Business Process Management (BPM) system automated and human process steps are orchestrated by process models. A user typically creates a process model by drawing a process diagram (e.g., flowcharts). Process diagrams comprise activities, which are typically represented as boxes, connected by control edges, which are typically represented by arrows from one activity to another. Process diagrams may contain conditional flow steps representing a choice between several possible branches in the diagram.

A contemporary process engine then creates process instances for individual cases, and executes the process by traversing the process diagram. Process instances are uniquely identified by a process instance identifier. Execution of the process instances is typically controlled by a process data model that represents the state of the process instance, including any data items associated to the process. The process engine typically enacts the order of execution as it is prescribed by the diagram. A contemporary BPM system also allocates and tracks utilization of resources required to perform the necessary process steps.

BRIEF SUMMARY

According to one embodiment of the present invention, a method for determining a process outcome based on a computed probability and altering the path of a process instance based on an expediting rule is provided. The method includes executing, by a processing device, a process instance in a process diagram, which includes a plurality of process steps. A condition associated with a first process step is identified. An outcome for the first process step is then determined based on a computed probability. Accordingly, the first process step is bypassed and the process instance is branched to a second process step based on an expediting rule. The expediting rule includes the condition and a branching action according to a selected outcome.

According to another embodiment of the present invention, a system for determining a process outcome based on a computed probability and altering the path of a process instance based on an expediting rule is provided. The system includes a computer processor and logic executable by the computer processor. The logic is configured to implement a method. The method includes executing a process instance in a process diagram, which includes a plurality of process steps. A condition associated with a first process step is identified. An outcome for the first process step is then determined based on a computed probability. Accordingly, the first process step is bypassed and the process instance is branched to a second process step based on an expediting rule. The expediting rule includes the condition and a branching action according to a selected outcome.

According to a further embodiment of the present invention, a computer program product for determining a process outcome based on a computed probability and altering the path of a process instance based on an expediting rule is provided. The computer program product includes a storage medium having computer-readable program code embodied thereon, which when executed by a computer processor, causes the computer processor to implement a method. The method includes executing a process instance in a process diagram, which includes a plurality of process steps. A condition associated with a first process step is identified. An outcome for the first process step is then determined based on a computed probability. Accordingly, the first process step is bypassed and the process instance is branched to a second process step based on an expediting rule. The expediting rule includes the condition and a branching action according to a selected outcome.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein are directed to determining a process outcome based on a computed probability and altering the path of a process instance based on an expediting rule. According to embodiments, a process instance is executed in a process diagram that includes a plurality of process steps. When a condition associated with a first process step is identified, embodiments determine an outcome for the first process step based on a computed probability. Accordingly, the first process step is bypassed and the process instance is branched to a second process step based on an expediting rule. The expediting rule may include the condition and a branching instruction according to embodiments disclosed herein.

Embodiments disclosed herein provide process expediting, either through application of policies layered on the model or through explicitly modeling interaction with a probabilistic process engine in the process model. For example, there could be an activity in the process model that obtains the probability from the probabilistic engine and branches based on that probability according to embodiments. Or, according to embodiments, a process activity could receive an event from a probabilistic process engine and then branch. According to embodiments, explicit policies external to the process model may refer both to process state and the probabilistic model of the process, and change the behavior of the model through direct action of the policy.

In typical business process models, process instances may be held up waiting for resource allocation. Contemporary process diagrams embed no knowledge of the likely future path of progress through the process diagram. Rather, a typical process engine enacts the order of execution as it is prescribed by the diagram. Typical process engines cannot therefore selectively force a specific outcome or process branch that is highly likely to occur anyway in order to expedite a process instance, even when this would be highly advantageous to the purpose of the process overall.

For example, a typical process diagram might describe several steps in the approval for a credit limit increase on a high value credit card, including a step requiring a human reviewer to approve the request. The card issuer may have a service level agreement that requires acceptance or rejection of such requests within a defined period of time. If the human review step is impeded due to a shortage of reviewers due to an influenza outbreak, existing process diagram systems could not look at the particulars of incoming requests and the status of the reviewer queue to determine based on past processing of similar applications that rejection was 90% or more probably for certain requests, and reject these to eliminate them from the overcrowded manual approval queue.

According to embodiments, a process manager may wish to create a process diagram that is "self training" in the sense that it learns over time how human actors carrying out their process steps typically respond to specific situations, and uses this information when enough certainty about those responses is known, to automatically determine the outcome of the process. According to embodiments, expediting may be self-learned over time such that the decision to expedite can be conducted automatically for future process instances that are similar to completed historical process instances that were expedited.

Accordingly, embodiments provide a mechanism for utilizing records of a past process execution to compute the probability of specific process outcomes. The probability of specific process outcomes may be based on data in the process data model at selected points in the process diagram as a process instance executes. Embodiments may execute policy statements that selectively alter the path that selected process instances subsequently take through the process diagram based on these probabilities and other state information known to the process engine. According other embodiments, a process diagram is not required, but rather the process definition may be inferred from a set of process execution traces using known process mining techniques. According to embodiments, a process manager can selectively resolve process instance outcomes based on well established probabilities of outcomes Referring now to FIG. 1, a block diagram of a computer system 10 suitable for selecting a process outcome based on a computed probability and altering the path of a process instance based on an expediting rule according to exemplary embodiments is shown. Computer system 10 is only one example of a computer system and is not intended to suggest any limitation as to the scope of use or functionality of embodiments described herein. Regardless, computer system 10 is capable of being implemented and/or performing any of the functionality set forth hereinabove.

Figure 1:
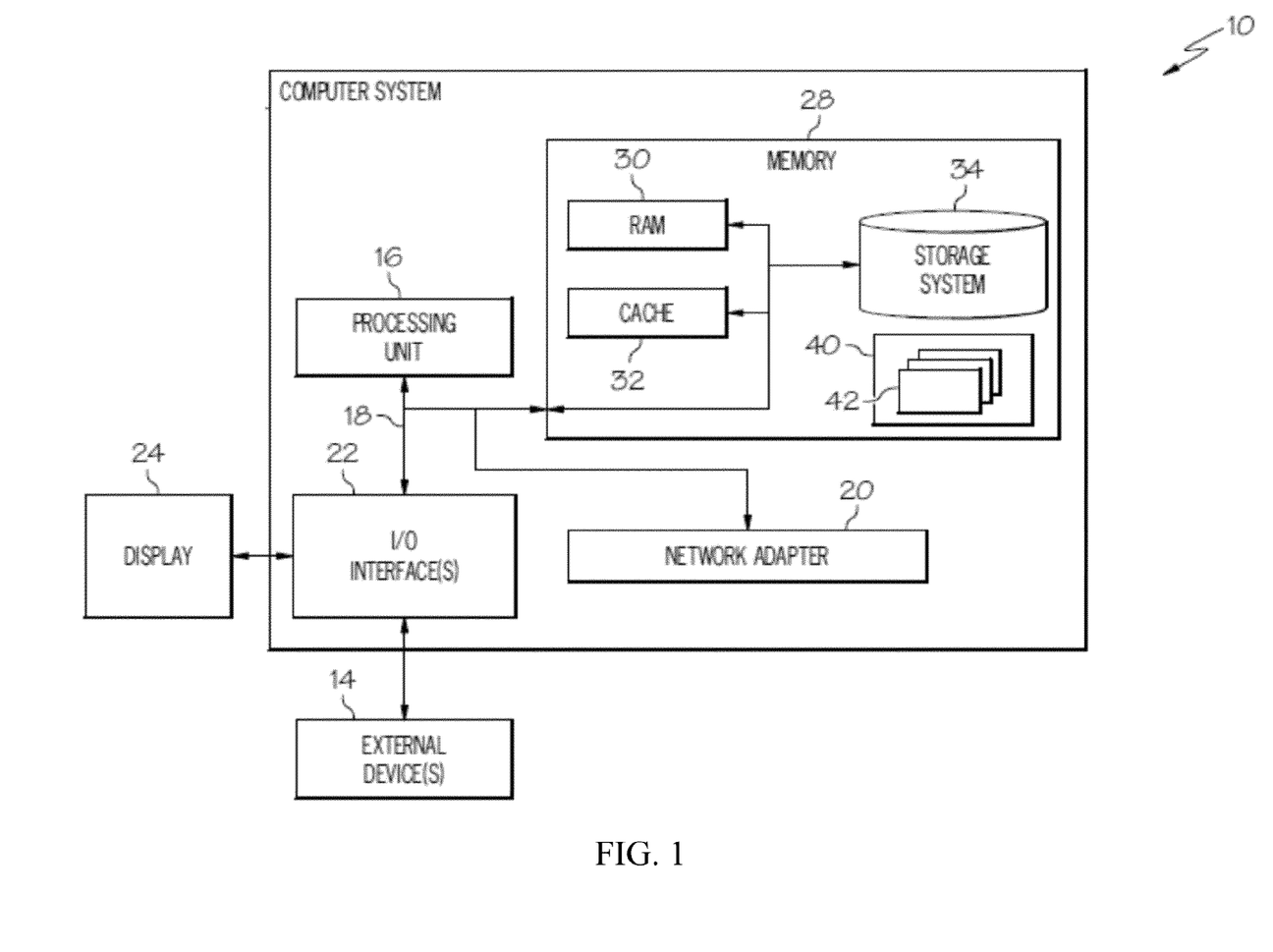
FIG. 1 depicts a block diagram of a computer system according to an embodiment.

Computer system 10 is operational with numerous other general purpose or special purpose computing system environments or configurations. Examples of well-known computing systems, environments, and/or configurations that may be suitable for use with computer system 10 include, but are not limited to, personal computer systems, server computer systems, thin clients, thick clients, cellular telephones, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 10 may be described in the general context of computer system-executable instructions, such as program modules, being executed by the computer system 10. Generally, program modules may include routines, programs, objects, components, logic, data structures, and so on that perform particular tasks or implement particular abstract data types. Computer system 10 may be practiced in distributed cloud computing environments where tasks are performed by remote processing devices that are linked through a communications network. In a distributed computing environment, program modules may be located in both local and remote computer system storage media including memory storage devices.

As shown in FIG. 1, computer system 10 is shown in the form of a general-purpose computing device, also referred to as a processing device. The components of computer system may include, but are not limited to, one or more processing devices 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 10 may include a variety of computer system readable media. Such media may be any available media that is accessible by computer system/server 10, and it includes both volatile and non-volatile media, removable and non-removable media.

System memory 28 can include computer system readable media in the form of volatile memory, such as random access memory (RAM) 30 and/or cache memory 32. Computer system 10 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 10 may also communicate with one or more external devices 14 such as a keyboard, a pointing device, a display 24, etc.; one or more devices that enable a user to interact with computer system/server 10; and/or any devices (e.g., network card, modem, etc.) that enable computer system/server 10 to communicate with one or more other computing devices. Such communication can occur via Input/Output (I/O) interfaces 22. Still yet, computer system 10 can communicate with one or more networks such as a local area network (LAN), a general wide area network (WAN), and/or a public network (e.g., the Internet) via network adapter 20. As depicted, network adapter 20 communicates with the other components of computer system 10 via bus 18. It should be understood that although not shown, other hardware and/or software components could be used in conjunction with computer system 10. Examples include, but are not limited to: microcode, device drivers, redundant processing units, external disk drive arrays, RAID systems, tape drives, and data archival storage systems, etc.

Figure 2:
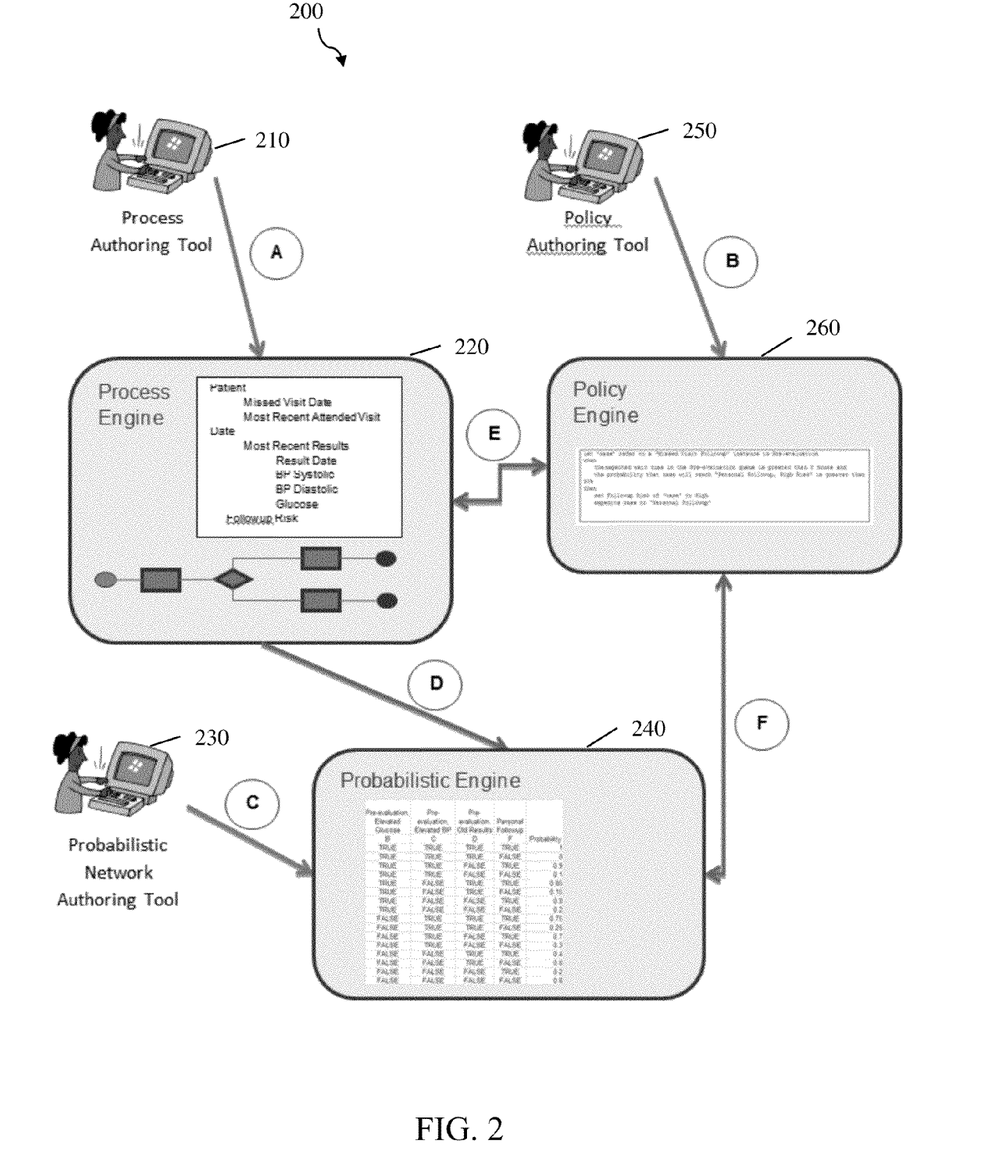
FIG. 2 depicts an expedited process execution (EPE) according to an embodiment.

With reference now to FIG. 2, an expedited process execution (EPE) 200 according to an embodiment is shown. The EPE may be implemented using the processing device 16 of computer system 10 as shown in FIG. 1. The EPE of an embodiment may comprise a process authoring tool 210, a process engine 220, a probabilistic network authoring tool 230, a probabilistic engine 240, a policy authoring tool 250, and policy engine 260.

According to an embodiment, the process authoring tool 210 may be used to describe process diagrams and process data models, and to publish them (A) to the process engine 220. The process engine 220 of an embodiment may execute process instances, and transmit (D) information on process state identifiers and process completion to the probabilistic engine 240. The process engine 220 of an embodiment may also transmit (E) process state, resource utilization, and process data model to the policy engine 260.

The probabilistic network authoring tool 230 of an embodiment may be used to describe the probabilistic network on which probabilistic reasoning will be based, and to publish (C) these to the probabilistic engine 240. The probabilistic network of an embodiment may alternatively be learned by the EPE system, in which case the probabilistic network authoring tool 230 would not be needed. The probabilistic engine 240 of an embodiment receives (D) information on process steps and completions in order to compute probabilities for probabilistic networks, and provides (F) probabilities and query capabilities to the policy engine 260 on request.

The policy authoring tool 250 of an embodiment may be used to author rules that govern expedited process execution in the process engine 220, and to publish (C) these rules to the policy engine 260. The policy engine 260 of an embodiment monitors the process state based on data received (E) from the process engine 220, evaluates rules with assistance (F) from the probabilistic engine 240, and demands (E) process state changes by the process engine 220.

According to an embodiment, a user (e.g., a process designer) may use the various authoring tools of the EPE to construct a probabilistic process model. The process designer may use the process authoring tool 210 to create a process diagram and a related process data model. According to another embodiment, the process diagram could be mined from a set of process execution traces using known mining tools.

The process designer may assign process state identifiers to tuples consisting of a flow step from the process diagram and a true/false predicate on items in the process data model according to an embodiment. There may be multiple process state identifiers related to a given flow step, but the predicates for the set of process state identifiers must be such that at most one is true for any possible set of values for the process data model according to an embodiment.

According to an embodiment, the process designer may either use the probabilistic network authoring tool 230 to construct one or more probabilistic networks related to the process diagram through its associated process state identifiers or may create a probabilistic network automatically by using well known techniques to create a Bayesian network or Markov model from process execution traces.

One embodiment of a probabilistic network may be a Bayesian network, which is a directed acyclic graph in which the nodes represent propositional variables and the edges represent causal influences. Conditional probability tables for the network describe the distribution of values for each node in terms of any directly antecedent nodes in the graph, or if a node has no antecedents, simply the observed probability of that variable. In a process related Bayesian network, the propositional variables are drawn from the set of created process state identifiers, or from combinations of these, and the causal influences are relationships between these states that are supposed by the process designer or learned from historical behavior of the EPE to be of predictive interest. Thus, according to an embodiment, the overall process related Bayesian model represents the process designer's or the learning algorithm's best choice of a useful model of probabilistic relationships between particular process states. Creation of the process related Bayesian network may be implemented through a robust Bayesian network authoring tool geared to a process designer knowledgeable about Bayesian statistics. Alternatively, the creation of the process related Bayesian network may be implemented through a simplified interface that enables a statistically unsophisticated process designer to answer a series of questions though a graphical user interface (GUI) to identify process states they would like to expedite. The process designer may also identify related process states that they believe may be predictive of the expedited states. The GUI tool then constructs the required process related Bayesian network. Another embodiment by which the creation of the process related Bayesian network may be implemented is through learning from a directed acyclic task graph of the process and historical traces.

Another embodiment of a probabilistic network could be the Markov system to represent data driven process execution that contains cycles and parallel execution paths. A Markov system can accurately represent a process diagram that contains cycles and parallel gateways. Such a system assumes that the next task depends only on the document content that has been updated or generated since the beginning of the process until the end of the current task, but not the tasks that have already executed.

According to an embodiment, the process designer may use the policy authoring tool 250 to manually create process expediting rules that relate conditions on the confirmed process state identifiers, imputed process state identifiers, the process data model, and information about resource availability and allocation to actions called forced process actions. Confirmed process state identifiers are process states that a given process instance has already reached, or definitively bypassed. Imputed process state identifiers are process states that a given process instance could potentially reach, but has not yet reached. Imputed process state identifiers are associated with a probability to reach with confidence parameters. Forced process actions are demands made to a specific process instance to change the state of the process data model or to change the state the next activity within the process instance to a specified activity within the process diagram. When such a demand is executed by the process engine 220, the process instance is said to have been expedited by the relevant process expediting rule according to an embodiment.

In an embodiment, each process expediting rule may be characterized by:

(i) A pre-condition that identifies a single confirmed process state identifier, the reaching of which by a process instance is a condition for the rest of the rule to be considered, (ii) Zero or more additional conditions on bypassed process state identifiers, probabilities and confidence intervals of imputed process state identifiers, the process data model for the process instance, and any information about resource availability and allocation or other process meta-state made available by the process engine 220, and (iii) One or more forced process actions whereby at most one of these forced process action can demand the process change the next activity on any currently executing branch, resulting in skipping some process steps, or redirection to a process step not otherwise reachable from the current state of the process. Other actions could include insertions of additional "ad-hoc" process steps, or marking of future process steps to be skipped when encountered.

According to an embodiment, actions that change the process path must be able to execute without causing runtime errors due to a change in the process. These errors may be of two types when a path is expedited: dangling control flow and unavailable data.

Figure 3:
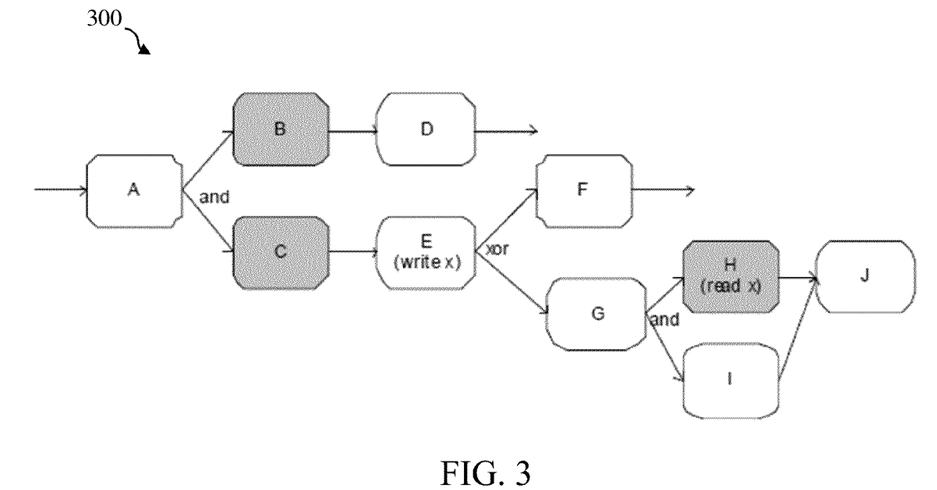
FIG. 3 depicts an example of a process with constraints on forced flow changes according to an embodiment.

With reference to FIG. 3, an example of a process 300 with constraints on forced flow changes will be explained in further detail. Referring to FIG. 3, a process instance is currently executing the parallel activities B and C. An expediting rule may trigger due to a precondition on the probability of reaching activity H and the corresponding action may be to move navigation to H. Unless handled, this could cause dangling control flow for activity J, because its incoming link (I, J) will not fire. An example of an unavailable data error is also present at activity H because it reads data from variable x which activity E should have written. Skipping activity E would thus result in activity H failing when trying to read x. An expediting solution must still determine what happens to other tasks that are not on those paths, such as those reachable from a current activity but not on a path to the target (such as activities D and I).

One embodiment for handling these possible runtime errors is to use a combination of static validation to determine potential errors at design time and prompt for user input to provide appropriate values for the missing information. Errors not detectable at design time can be detected and the user prompted for input at runtime. For design time validation, static process validation techniques exist to determine control flow soundness in a process and read/write dependencies. According to an embodiment, this information may be used to alert a user at design time of possible dangling control flow or unavailable data. The user may then specify how to handle each dangling control edge and can manually provide values for potentially unavailable data. For example, according to an embodiment, the designer may specify that, when the expediting rule to go to activity H executes, the dangling connector (I, J) can be treated as firing with a 'true' value, activity D should still execute, and that the value of variable x should be set to 5 if it is found to be uninitialized at activity H.

The expediting rules of an embodiment may be defined more generally with thresholds that are automatically learned as the process executes. The thresholds could serve as part of the conditions of the rules according to an embodiment. Actions may be chosen from a predefined set and allocated to these rules according to an embodiment. An example of such a general rule with thresholds and actions is:

When

The expected wait time>Time_Threshold

Then

Insert "Meeting With Manager"

The time threshold in this rule is automatically configured and learned over time as the process executes. The preconditions and additional conditions of a rule of an embodiment may be derived automatically for data-driven business processes on the basis of decision trees or other machine learning algorithm. The process designer could therefore use a machine learning algorithm to automatically determine the conditions on a rule, and only need to manually specify the actions of the rule.

Figure 4:
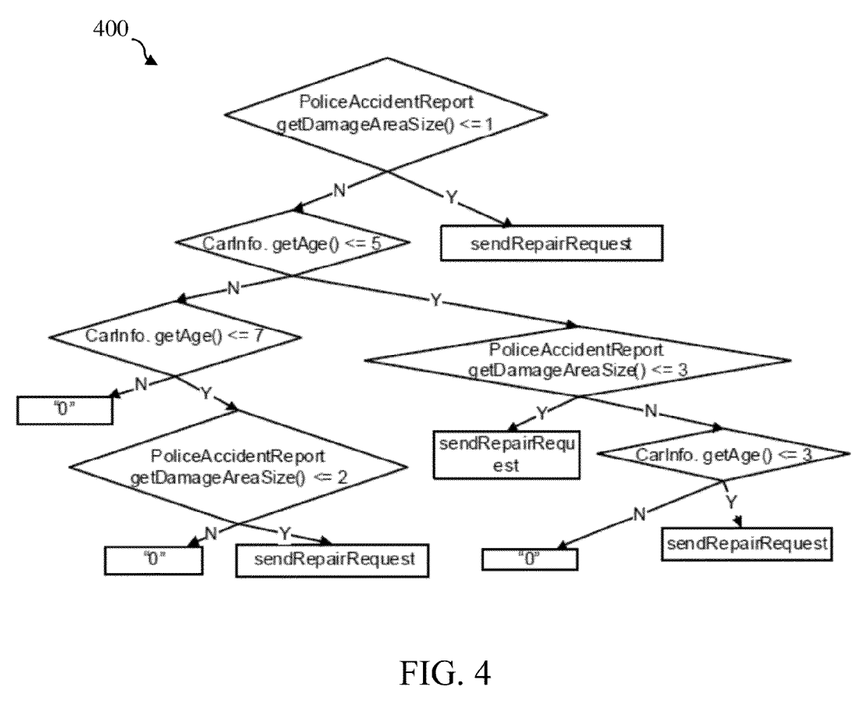
FIG. 4 depicts an example of a binary decision tree learned from training traces according to an embodiment.

A binary decision tree trained at a decision point in a process diagram provides a tree structured plan of a set of attributes, and the conditions under which they lead to a specific outcome or not. Referring to FIG. 4, an example of a binary decision tree 400 learned from training traces belonging to an automobile insurance process is shown. This binary decision tree 400 indicates that if the damage area size is <=2, and if the car's age is <=7, then the repair request for the care will be sent. Thus the following rule conditions may be extracted from this tree:

When

The damage area size <=2 and the car's age is <=7

Then

<Process Designer Fills in the Actions>

Imputed process state identifiers of an embodiment are associated with a probability to reach and potentially with confidence parameters. Imputed process state identifiers could be inferred by a decision tree's classification on a given process instance's data. For example, with respect to the binary decision tree 400, given the values of the car's age and damage area size for a given process instance, the decision tree 400 can predict the probability that "send repair request" will execute. This classification may serve as an imputed process state identifier. For example, " . . . the probability that the case will reach "send repair request" is greater than 90%".

The probabilistic process models of an embodiment are deployed to an operational environment comprising the process engine 220, the probabilistic engine 240, and the policy engine 260. According to an embodiment, as part of the publication of process expediting rules to the policy engine 260, the policy engine 260 registers with the process engine 220 to be notified when any process state identifiers that are referenced by a process expediting rule is reached by a process instance.

The process engine 220 of an embodiment executes process instances by stepping through the process diagram under the control of the evolving process data model instance. As each process state identifier is reached by a process instance (i.e., a process instance traverses the flow step associated to a process state identifier when the associated data items match the states or range for the data item, as described by the process state identifier definition), the process engine 220 reports the process instance identifier and the process state identifier just reached to the probabilistic engine 240. The probabilistic engine 240 records this data.

According to an embodiment, when a process instance finishes normally (i.e., the process is not expedited by any process expediting rule), the probabilistic recording engine updates the conditional probability table and confidence statistics for the process related probabilistic network associated with the process diagram for that process instance, using all of the recorded process state identifier reports for that instance.

During process instance execution, the policy engine 260 of an embodiment may observe the state of the process engine 220. If the policy engine 260 observes a state that matches the conditions of any process expediting rule, the policy engine 260 signals the process engine 220 with a demand that forced process actions of that rule be executed. Evaluation of the conditions may be a combination of evaluation of deterministic conditions by the policy engine 260 itself, and evaluations of probabilistic conditions evaluated by the probabilistic engine 240 on behalf of the policy engine 260.

Figure 5:
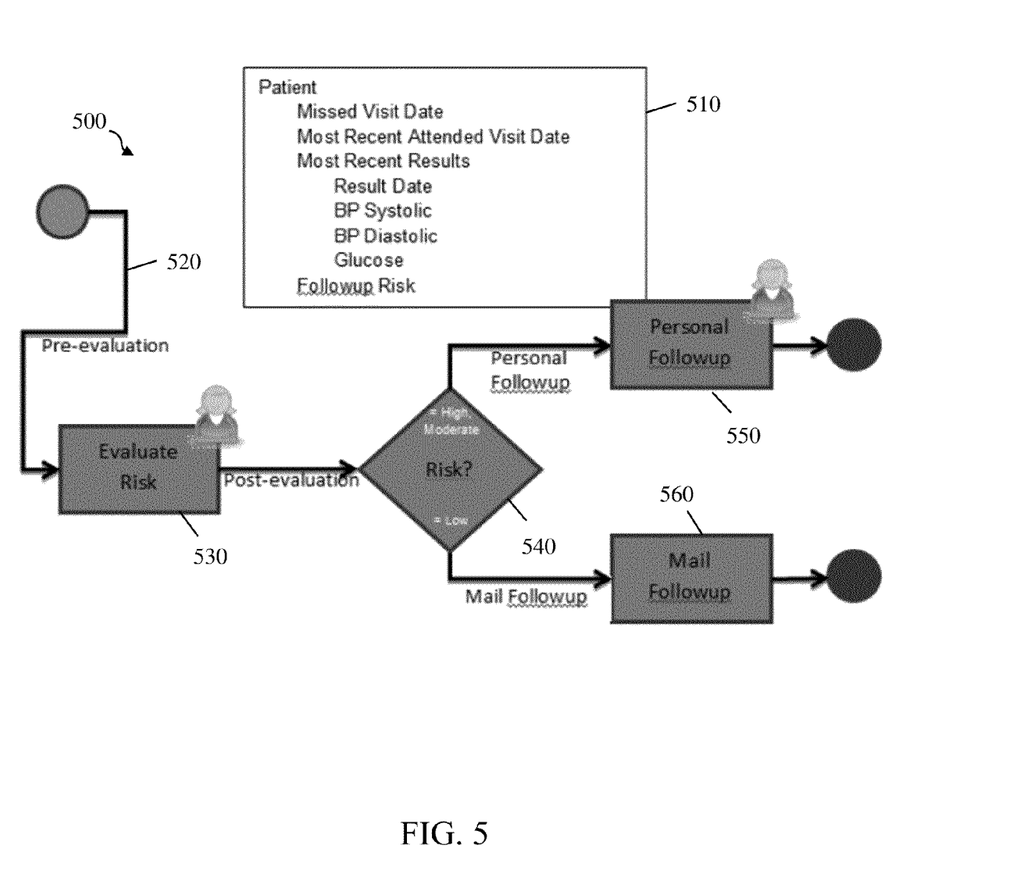
FIG. 5 depicts an example of expediting a resource constrained process using the EPE of an embodiment.

Referring to FIG. 5, an example of expediting a resource constrained process using the EPE of an embodiment is shown. In the example depicted in FIG. 5, the process designer has created a process diagram 500 and process data model 510 for a "Missed Visit Followup" process. A process instance of this process diagram 500 will be started each time a patient in a monitored pregnancy cohort misses a pre-natal visit without having made prior arrangements to reschedule.

In the Evaluate Risk activity 530 a nurse evaluates the patient's record based on a pre-evaluation activity 520 and assigns a Followup Risk 540 of high, moderate, or low to indicate the risk associated with delaying the patient's next prenatal visit. Depending on this risk, either a Personal Followup 550 (whereby someone "tracks down" the patient to schedule the next visit) or a Mail Followup 560 activity is performed. Because the Evaluate Risk activity 530 is carried out by nurses with skills appropriate to evaluating medical records related to pregnancy, there is a limited set of available resources available in any given time frame to perform this activity. The process engine 220 keeps a queue of process instances (i.e., cases) that need evaluation, and nurse evaluators remove cases from this queue and evaluate them as their time allows. In addition, the process engine 220 of an embodiment may compute a "expected wait time" for each instance in the queue. A Personal Follow-up activity 550 is also a human task with an associated queue, a characteristic oldest waiting instance, and queue length.

Figure 6:
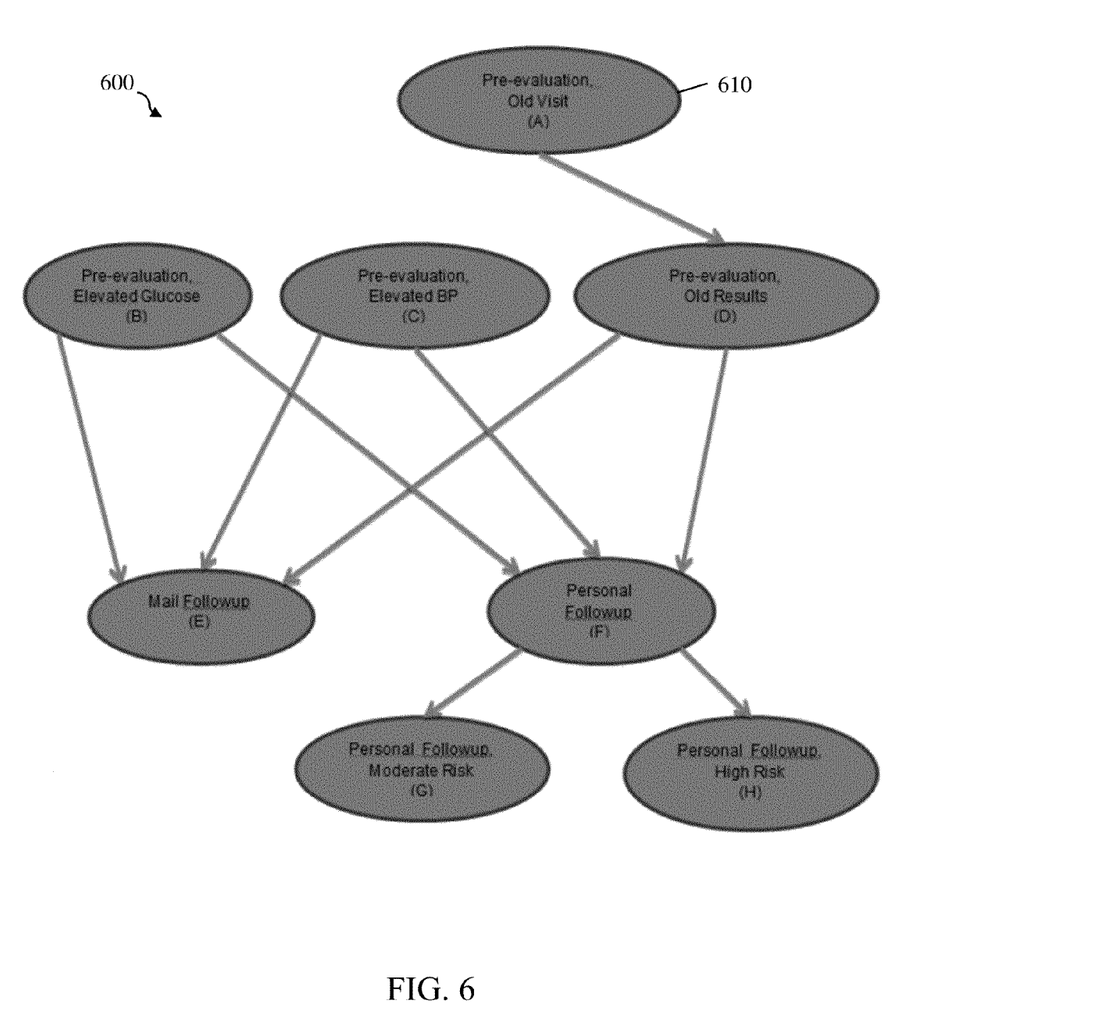
FIG. 6 depicts a process related Bayesian network according to an embodiment.

The Process Designer has also created a process related Bayesian Network 600 shown in FIG. 6. In this process related Bayesian network, each node refers to a process state identifier. For example, the node "Pre-evaluation, Old Visit" 610 refers to the pre-evaluation activity 520 and a predicate "Most Recent Attended Visit Date is more than 3 weeks old."

Finally, the process designer writes process expediting rules for the "Missed Visit Followup" process of FIG. 5. For this example, the process designer wishes to move cases that have a high probability of requiring a Personal Followup 550 and a significant urgency of action past the blocking Evaluate Risk queue. For example:

Let 'case' refer to a "Missed Visit Followup' instance in pre-evaluation
  When
    The expected wait time in the Pre-evaluation queue is greater than 8 hours and the probability that case will reach "Personal Followup, High Risk" is greater than 90% within +/−5% confidence Then
  Set Followup Risk of 'case' to High and expedite case to "Personal Followup"

Publication of this rule to the policy engine 260 causes the policy engine 260 to inform the process. When this EPE is published and begins processing Missed Followup Visit process instances, the process engine 220 will process instances according the process diagram 500. The conditional probability tables will initially be empty, meaning no probabilistic conditions can be true. As process instances complete, the tables can be filled out making probabilistic conditions available for evaluation, and as more instances complete, the confidence level for probabilistic evaluations will increase according to the usual laws of probability.

As process instances execute, the policy engine 260 continuously evaluates the process expediting rule conditions based on information from the process engine 220. In this case the only rule will be considered when a process instance reaches the pre-evaluation activity 520. At some point during execution of process instances, a nurse shortage may cause the predicted wait time for the Evaluate Risk activity 530 to exceed the threshold set by the rule, requiring the policy engine 260 to inquire of the probabilistic engine 240 (e.g., the Bayesian engine) if the probability condition applied to this process instance is true. The probability condition may fail because the conditional probability tables required are not yet complete, because the computed probability does not exceed the threshold, or because the confidence of the computed probability is not sufficient. If the probability condition passes, than this particular process instance will bypass the Evaluate Risk activity 530 and go directly to the Personal Followup activity 550.

Figure 7:
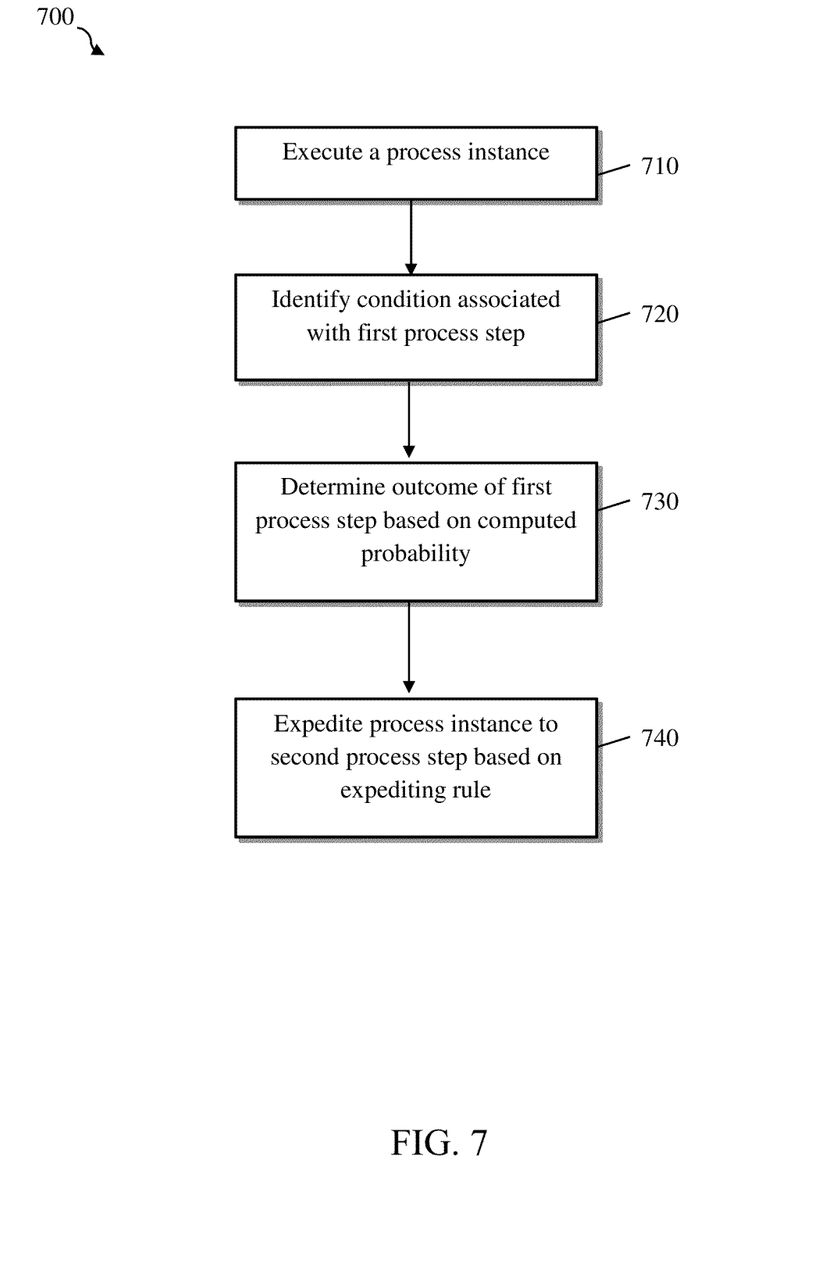
FIG. 7 depicts an operation for probabilistically expediting a process according to an embodiment.

Referring to FIG. 7, an operation 700 for probabilistically expediting a process according to an embodiment is shown. At block 710, a process instance is executed by a process diagram processing device 16. The process diagram of an embodiment comprises a plurality of process steps. According to an embodiment, a condition associated with a first process step is identified, as shown in block 720. The condition may include, but is not limited to, a resource constraint that prevents processing of the first process step in a defined period of time.

At block 730, an outcome for the first process step is determined based on a computed probability according to an embodiment. The computed probability may be determined utilizing a history for the first process step.

At block 740, the process instance is branched to a second process step based on an expediting rule, thereby bypassing the first process step according to an embodiment. The expediting rule of an embodiment includes the condition and a branching action according to the selected outcome determined at block 730. The second process step of an embodiment may be a pre-existing step from the process diagram or may be a new dynamically created process step based on the expediting rule. According to an embodiment, a user may select an outcome for the first process step and the expediting rule using a user interface.

Embodiments disclosed herein are directed to determining a process outcome based on a computed probability and altering the path of a process instance based on an expediting rule. According to embodiments, a process instance is executed in a process diagram that includes a plurality of process steps. When a condition associated with a first process step is identified, embodiments determine an outcome for the first process step based on a computed probability. Accordingly, the first process step is bypassed and the process instance is branched to a second process step based on an expediting rule. The expediting rule may include the condition and a branching instruction according to embodiments disclosed herein.

Technical effects and benefits include the ability to expeditiously resolve process instance outcomes based on established probabilities of outcomes. As a result, processes according to an embodiment may be adaptive to resource constraints through self-training.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system, comprising:
    a memory having computer readable computer instructions; and
    a processor for executing the computer readable instructions to perform a method comprising:
        executing a process instance in a process diagram, the process diagram comprising a plurality of process steps;
        identifying a condition associated with a first process step;
        determining an outcome for the first process step based on a computed probability; and
        bypassing the first process step and branching the process instance to a second process step based on an expediting rule, the expediting rule comprising the condition and a branching action according to a selected outcome;
        wherein the expediting rule is characterized by a precondition that identifies a single confirmed process state identifier, the reaching of which by the process instance is a condition for a remainder of the expediting rule to be implemented.

2. The computer system of claim 1, wherein the condition comprises a resource constraint that prevents processing of the first process step in a defined period of time.

3. The computer system of claim 1, wherein the second process step is a pre-existing step in the process diagram.

4. The computer system of claim 1, wherein the second process step is a new dynamically created process step.

5. The computer system of claim 1, wherein the expediting rule is automatically derived from historical execution traces and interpreted by a process engine.

6. The computer system of claim 1, wherein the expediting rule is self-learned over time and is automatically executed for subsequent process instances that are similar to process instances previously expedited.

7. The computer system of claim 1, wherein the expediting rule is manually derived using a policy authoring tool.

8. The computer system of claim 1, wherein the computed probability is determined utilizing a history for the first process step.

9. The computer system of claim 1, configured to provide a user with an option, via a user interface, to select the outcome based on the condition.

10. The computer system of claim 1, wherein the expediting rule is further characterized by an additional condition on bypassed process state identifiers, probabilities and confidence intervals of imputed process state identifiers, a process data model for the process instance, and resource availability and allocation.

11. The computer system of claim 1, wherein expediting rule is further characterized by a forced process action, wherein the forced process action demands the process change a next activity on any currently executing branch, resulting in skipping at least one process step, or redirection to a process step not otherwise reachable from a current state of the process.

12. A computer program product, comprising:
    a non-transitory computer readable storage medium having program code embodied therewith, the program code executable by a processing device for:
        executing a process instance in a process diagram, the process diagram comprising a plurality of process steps;
        identifying a condition associated with a first process step;
        determining an outcome for the first process step based on a computed probability; and
        bypassing the first process step and branching the process instance to a second process step based on an expediting rule, the expediting rule comprising the condition and a branching action according to a selected outcome;
        wherein the expediting rule is characterized by a precondition that identifies a single confirmed process state identifier, the reaching of which by the process instance is a condition for a remainder of the expediting rule to be implemented.

13. The computer program product of claim 12, wherein the condition comprises a resource constraint that prevents processing of the first process step in a defined period of time.

14. The computer program product of claim 12, wherein the second process step is a pre-existing step in the process diagram.

15. The computer program product of claim 12, wherein the second process step is a new dynamically created process step.

16. The computer program product of claim 12, wherein the expediting rule is automatically derived from historical execution traces and interpreted by a process engine.

17. The computer program product of claim 1, wherein the expediting rule is self-learned over time and is automatically executed for subsequent process instances that are similar to process instances previously expedited.

18. The computer program product of claim 1, wherein the expediting rule is manually derived using a policy authoring tool.

19. The computer program product of claim 1, wherein the computed probability is determined utilizing a history for the first process step.

20. The computer program product of claim 1, further comprising provide a user with an option, via a user interface, to select the outcome based on the condition.

* * * * *